United States Patent [19]

Kalinichenko et al.

[11] 4,200,908

[45] Apr. 29, 1980

[54] DEVICE FOR DIGITAL CONTROL OF POLYPHASE THYRISTOR-PULSE CONVERTER

[75] Inventors: Anatoly Y. Kalinichenko; Valentin M. Vlasov; Grigory E. Kiksman, all of Moscow, U.S.S.R.

[73] Assignee: Vsesojuzny Nauchno-Issledovatelsky Institut Vagonostroenia, Moscow, U.S.S.R.

[21] Appl. No.: 892,790

[22] Filed: Apr. 3, 1978

[51] Int. Cl.² .......................................... H02M 7/515
[52] U.S. Cl. ...................................... 363/124; 363/71; 363/137
[58] Field of Search ...................... 307/11–13, 307/40, 84, 240–242, 252 K, 252 M; 318/722, 345 E, 345 G, 800, 801, 803, 811; 363/71, 124, 135, 137, 138

[56] References Cited

U.S. PATENT DOCUMENTS

| | | | |
|---|---|---|---|
| 3,757,140 | 9/1973 | Gurwicz et al. | 363/124 X |
| 3,826,959 | 7/1974 | Anderson | 363/124 X |

FOREIGN PATENT DOCUMENTS 41246  5/1968  Japan ........................................ 363/124

Primary Examiner—William M. Shoop
Attorney, Agent, or Firm—Lackenbach, Lilling & Siegel

[57] ABSTRACT

A device for digital control of a polyphase thyristor-pulse converter comprises a master oscillator connected to a clock pulse counter. The clock pulse counter is connected to the power thyristors of the thyristor-pulse converter through a decoder for time-constant pulse trains. The device also comprises a control unit connected to a bidirectional pulse counter. Furthermore, the device comprises decoders for time-shifted pulse trains, each decoder having inputs connected to the logical outputs of the clock pulse counter and having outputs connected to the other power thyristors of the thyristor-pulse converter.

1 Claim, 3 Drawing Figures

DEVICE FOR DIGITAL CONTROL OF POLYPHASE THYRISTOR-PULSE CONVERTER

The present invention relates to automatic system for controlling thyristor-pulse d-c converters and, more particularly, the invention relates to devices for digital control of a polyphase thyristor-pulse converter.

FIELD OF APPLICATION OF THE INVENTION

The present invention can be used in electric traction systems and in industrial d-c drives.

BACKGROUND OF THE INVENTION

The thyristors of polyphase thyristor-pulse converters are controlled by time-shifted and time-constant trains of control pulses applied to the corresponding thyristors of this converter. In this case, in order to reduce the current fluctuation in the power supply source and in the load, it is necessary that, simultaneously with the process of shaping the time-shifted and time-constant pulse trains, the start of operation of each successive phase of the polyphase thyristor-pulse converter is shifted with respect to preceding phase by $(1/m)$ T, where m is the number of phases of the thyristor-pulse converter, T is the switching period of the thyristor-pulse converter.

Well known in the art is a device for digital control of a polyphase thyristor-pulse converter (cf. "Proceedings of the Dnepropetrovsk Institute of Railway Engineers" vol. 106, 1971, pp. 65–70). This device includes a clock counter and a bidirectional counter connected to a decoder, a switch and a clock pulse generator. In this device the filling factor, which is the ratio of the duration of the conductive state of the thyristor of the thyristor-pulse converter to the period of switching the thyristors of the thyristor-pulse converter, is varied digitally. The discretity value depends on the number of triggers in the counters.

However, this device comprises a great number of elements and this results in low operational reliability, a large size and high cost.

Also known in the art is a device for digital control of thyristor-pulse converters (cf. USSR Inventor's Certificate No. 424290, 1971), which includes a master oscillator connected to the input of a clock pulse counter unit having a plurality of clock counters whose number correponds to that of the phases.

The device also includes several decoders whose number is equal to that of the phases of the thyristor-pulse converter. The logical outputs of the clock pulse counter unit are connected to the logical inputs of every decoder. In this case each decoder is connected only to the logical outputs of one clock pulse counter of the clock pulse counter unit. Furthermore, the device has a unit for counting the control pulses, a plurality of bidirectional pulse counters, the number of which is equal to the number of phases, and which are connected to the other logical inputs of the decoders. Thus, in the known device it is necessary to use several bidirectional pulse counters of the control pulse counter unit and several clock pulse counters of the clock pulse counter unit for shaping a plurality of time-shifted and time-constant pulse trains, the number of said counters being equal to the number of phases of the thyristor-pulse converter. This reduces the reliability, increases the input power, size, cost and also deteriorates the quality of control due to the technological scatter of the parameters of the employed pulse counters. The scatter of parameters of the pulse counters also affect the shift and time position of the pulses thus changing the power current and worsening the spectrum of harmonic components in the power source.

BRIEF DESCRIPTION OF THE INVENTION

An object of the present invention is to improve the quality of controlling a thyristor-pulse converter.

Another object of the invention is to increase the reliability of the device and its efficiency.

The main object of the invention is to provide such a device for digital control of a polyphase thyristor-pulse converter that high quality of controlling the polyphase converter is achieved.

This and other objects are attained by providing a device for digital control of a thyristor-pulse converter comprising a master oscillator whose output is connected to the input of a clock pulse counter unit electrically connected to the power thyristors of the thyristor-pulse converter, a control unit whose adding and subtracting outputs are connected to the adding and subtracting inputs of a control pulse counter unit, and decoders for time-shifted pulse trains, the number of said decoders being equal to the number of phases of the thyristor-pulse converter; the inputs of each decoder are connected to the logical outputs of the clock pulse counter unit and control pulse counter unit, while the outputs are connected to the other power thyristors of the thyristor-pulse converter; according to the invention, the clock pulse counter unit is made in the form of a clock pulse counter having logical outputs determining the states of the clock pulse counter corresponding to the shift of operation of each phase of the thyristor-pulse converter by $(1/m)T$, where m is the number of phases of the thyristor-pulse converter and T is the switching period of the thyristors of the thyristor-pulse converter connected to the power thyristors of the thyristor-pulse converter through a decoder for time-constant pulse trains; the control pulse counter unit is made in the form of a bidirectional pulse counter; each decoder for time-shifted pulse trains includes dual diode matrices determining the shift of the time-shifted pulses by $(1/m)$ T and having inputs connected to the logical outputs of the clock pulse counter of the clock pulse counter unit and diode matrices determining the identical states of the bidirectional pulse counter whose inputs are connected to the logical outputs of the bidirectional pulse counter of the control pulse counter unit.

BRIEF DESCRIPTION OF THE DRAWINGS

The invention will be further described by way of examples illustrating other objects and advantages of the invention, reference being made to the accompanying drawings, in which.

DETAILED DESCRIPTION OF THE INVENTION

Figure 1:
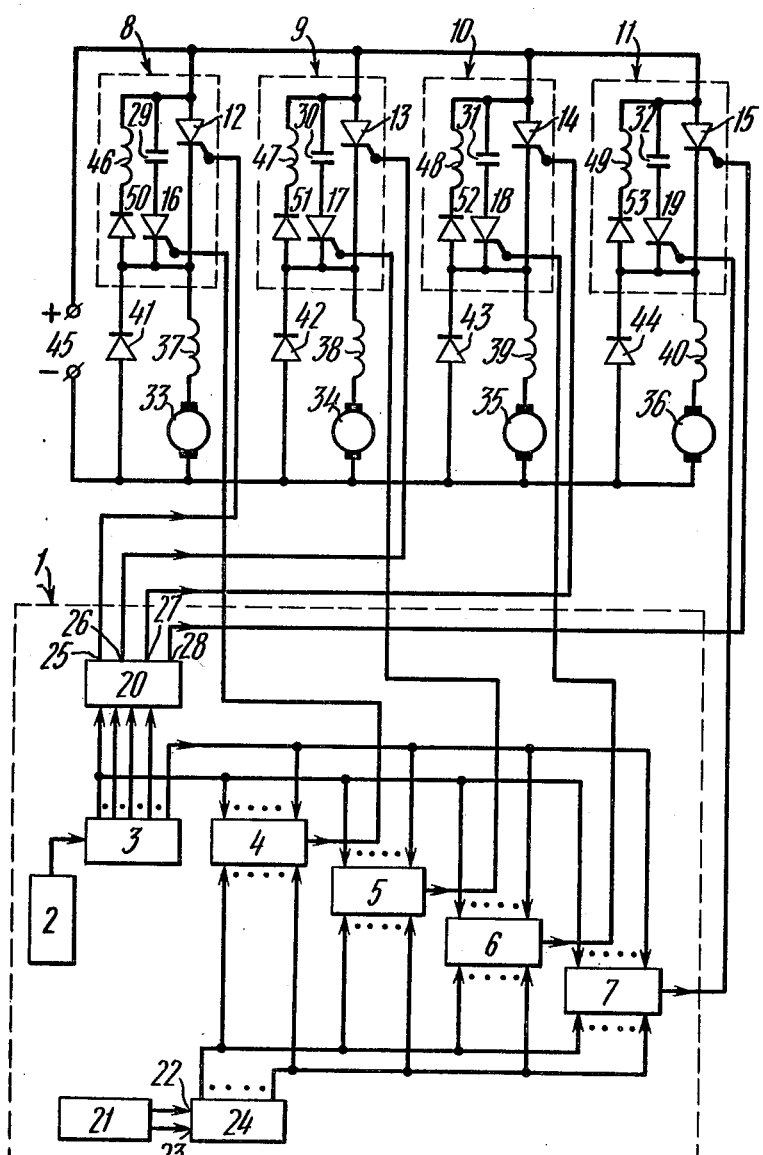
FIG. 1 is a functional diagram of the proposed device for digital control of a polyphase (4-phase) converter, according to the invention.

The proposed device 1 (FIG. 1) for digital control of a polyphase converter includes a master oscillator 2 whose output is connected to the input of a clock pulse counter 3. The clock pulse counter 3 is a binary clock pulse counter having n digits (triggers).

The clock pulse counter 3 has its logical outputs, the number of which is equal to the double number of digits of this counter, connected to the logical inputs of each of decoders 4, 5, 6, 7 for time-shifted pulse trains. Each decoder is a dual diode matrix. At the same time, the logical outputs of the clock pulse counter 3 determining the states of the clock counter corresponding to the time shift of the start of operation of each phase 8, 9, 10, 11 of the thyristor-pulse converter by $(1/m) T = (1/4) T$, where T is the switching period of the power thyristors 12, 13, 14, 15, 16, 17, 18, 19 of the thyristor-pulse converter, m is the number of phases 8, 9, 10, 11 of the thyristor-pulse converter equal to four, are connected to a decoder 20 for time-constant pulse trains. A unit 21 for controlling an adding output 22 and a subtracting output 23 is connected to the adding and subtracting input of a control pulse counter unit 24. The control pulse counter unit 24 is made in the form of a bidirectional pulse counter having a number of digits equal to the number of digits of the clock pulse counter. (Further this counter will be called the bidirectional pulse counter 24). The bidirectional pulse counter 24 has logical outputs connected to the other logical inputs of each of the decoders 4, 5, 6, 7 for time-shifted pulse trains. The decoder 20 for time-constant pulse trains has outputs 25, 26, 27, 28 connected respectively to the main thyristors 12, 13, 14, 15 (phases 8, 9, 10, 11) of the four-phase thyristor-pulse converter. The switching thyristors 16, 17, 18, 19 of the phases 8, 9, 10, 11 of the thyristor-pulse converter are connected to the outputs of the decoders 4, 5, 6, 7 for time-shifted pulse trains, respectively. The phases 8, 9, 10, 11 of the thyristor-pulse converter have switching capacitors 29, 30, 31, 32 connected to the main thyristors 12, 13, 14, 15 and to the switching thyristors 16, 17, 18, 19, motors 33, 34, 35, 36 connected to windings 37, 38, 39, 40 and shunted with reverse diodes 41, 42, 43, 44 connected to the negative terminal of a power source 45. Connected to the positive terminal of the power source 45 is a circuit consisting of a switching choke coil 46, 47, 48, 49 and a switching diode 50, 51, 52, 53 coupled in series.

The power thyristors 12, 13, 14, 15, 16, 17, 18, 19 can be connected to the control device I in another way without disturbing the principle of operation of the proposed device 1. Thus, the main thyristors 12, 13, 14, 15 can be connected to the outputs of the decoders 4, 5, 6, 7 for time-shifted pulse trains, while the switching thyristors 16, 17, 18, 19 can be connected to the outputs 25, 26, 27, 28 of the decoder 20 for time-constant pulse trains.

Figure 2:
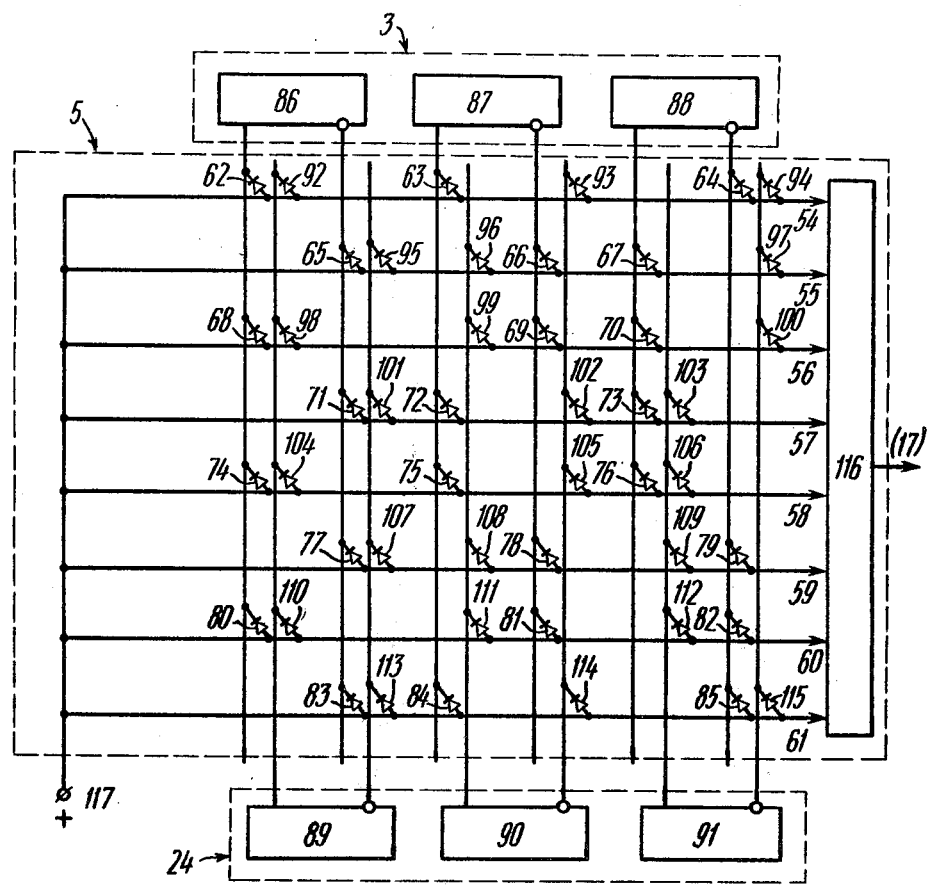
FIG. 2 is a circuit diagram of the decoder for time-shifted pulse trains connected to the second phase of the thyristor-pulse converter, according to the invention.

The decoder 5 (FIG. 2) for time-shifted pulse trains connected to the switching thyristor 17 of the second phase 9 has output buses 54, 55, 56, 57, 58, 59, 60, 61, the number of which is equal to $2^n$ and which are connected through diode matrices 62, 63, 64, 65, 66, 67, 68, 69, 70, 71, 72, 73, 74, 75, 76, 77, 78, 79, 80, 81, 82, 83, 84, 85 to the outputs of the triggers 86, 87, 88 of the clock pulse counter 3. The triggers 89, 90, 91 of the bidirectional pulse counter 24 are connected to the output buses 54, 55, 56, 57, 58, 59, 60, 61 of the decoder 5 for time-shifted pulse trains through diode matrices 92, 93, 94, 95, 96, 97, 98, 99, 100, 101, 102, 103, 104, 105, 106, 107, 108, 109, 110, 111, 112, 113, 114, 115. This connection of the diode matrices 62–85, 92–115 provides for a time shift of the start of operation of the switching thyristor 17 of the second phase 9 by 0.25 T with respect to the start of operation of the switching thyristor 16 of the second phase 8 of the thyristor-pulse converter. This time shift is caused by connection of said diodes 62–85, 92–115 to the output buses 54–61 of the decoder 5 in accordance with the different states of the triggers 86, 87, 88 of the clock pulse counter and of the triggers 89, 90, 91 of the bidirectional pulse counter 24, which are given in Table I for the 3-digit (n=3) pulse counters 3,24.

Table 1

| State No. | Triggers of clock and bidirectional counters 3 and 24 | | |
|---|---|---|---|
| | 86,89 | 87,90 | 88,91 |
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |
| 8 | 0 | 0 | 0 |

Thus, the output bus 54 of the decoder 5 is connected to the clock pulse counter 3 through the diode matrices 62, 63, 64 in accordance with the third state of the triggers 86, 87, 88 of the clock pulse counter 3.

The output bus 55 of the decoder 5 is connected to the clock pulse counter 3 through the diode matrices 65, 66, 67 in accordance with the fourth state of the triggers 86, 87, 88 of the clock pulse counter 3.

The remaining output buses 56–61 of the decoder 5 for time-shifted pulse trains are connected to the clock pulse counter 3 in a similar way and in accordance with the subsequent states of the triggers 86, 87, 88 of the counter 3.

The bidirectional pulse counter 24 is connected to the output bus 54 of the decoder 5 through the diode matrices in accordance with the first state of the triggers 89, 90, 91 of the bidirectional pulse counter 24. The output bus 55 of the decoder 5 is connected to the bidirectional pulse counter 24 through diode matrices 95, 96, 97 in accordance with the second state of the triggers 89, 90, 91 of the bidirectional pulse counter 24. The output bus 56 on the decoder 5 is connected to the bidirectional pulse counter 24 through the diode matrices 98, 99, 100 in accordance with the third state of the triggers 89, 90, 91 of the bidirectional pulse counter 24. The subsequent output buses 57, 58, 59, 60, 61 of the decoder 5 are connected in accordance with the fourth, fifth sixth, seventh, and eighth states of the triggers 89, 90, 91 of the bidirectional pulse counter 24.

The output buses 54, 55, 56, 57, 58, 59, 60, 61 of the decoder 5 for time-shifted pulse trains are connected to an AND-gate 116. The output of the AND-gate 116 forms an output of the decoder 5. The output buses 54–61 are connected directly to the positive terminal of the power source 117.

The ouput buses 54–61 can be connected to the power supply source 117 through resistors whose parameters are selected in terms of a required level of the output signal of the decoder 5.

Figure 3:
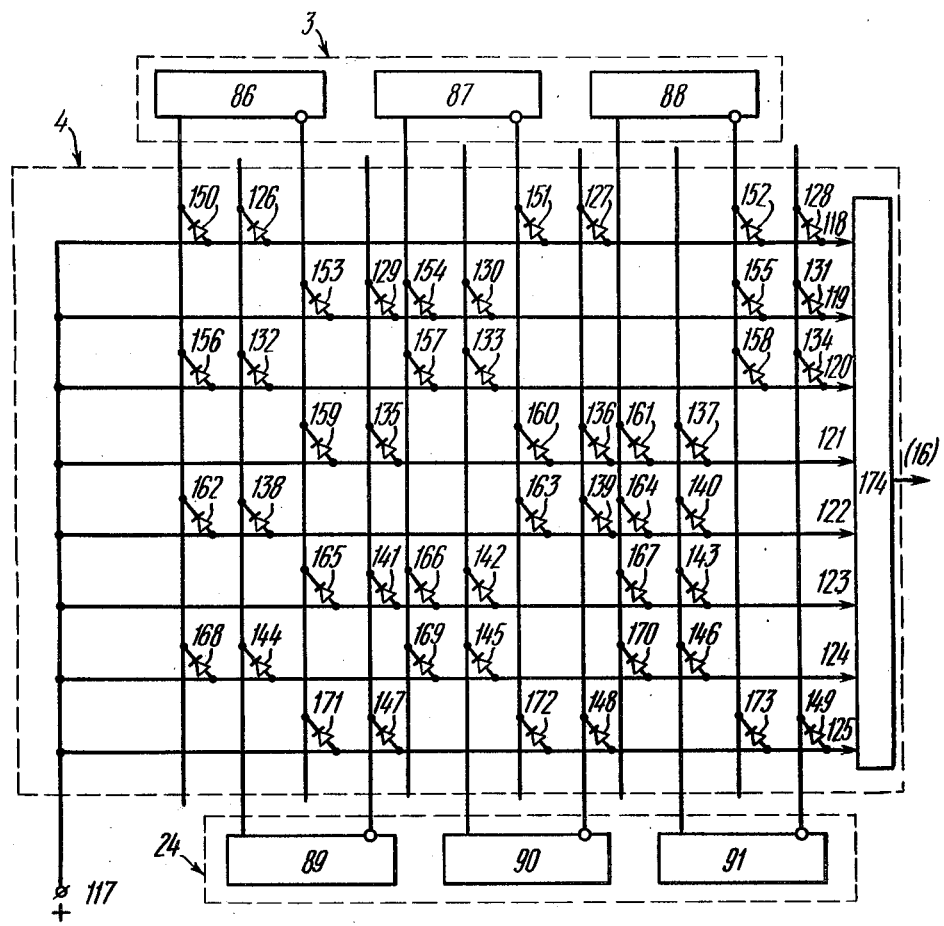
FIG. 3 is a circuit diagram of the decoder for time-shifted pulse trains connected to the first phase of the thyristor-pulse converter according to the invention.

The phase 8 of the thyristor-pulse converter is connected to the decoder 4 (FIG. 3) for time-shifted pulse trains, which provides a time shift by (1/4) T ((1/m) T) pulses sent from the output of the decoder 4 for time-shifted pulse trains with respect to the pulses sent from the output of the decoder 5 for time-shifted pulse trains. The decoder 4 for time-shifted pulse trains has output buses 118, 119, 120, 121, 122, 123, 124, 125, which are connected through diode matrices 126-149 to the triggers 89, 90, 91 of the bidirectional pulse counter 24 similarly to the connections in the decoder 5 for time-shifted pulse trains.

The output bus 118 of the decoder 4 for time-shifted pulse trains is connected to triggers 89, 90, 91 of the bidirectional pulse counter 24 through the diode matrices 126, 127, 128 in accordance with the first state (Table 1) of the triggers 89, 90, 91. The output bus 119 of the decoder 5 is connected to the triggers 89, 90, 91 of the bidirectional pulse counter 24 through the diode matrices 129, 130, 131 in accordance with the second state of the triggers 81, 82, 83. The output bus 120 of the decoder 5 is connected to the triggers 89, 90, 91 of the bidirectional pulse counter 24 through diode matrices 132, 133, 134 in accordance with the third state of the triggers 89, 90, 91. The other output buses 121-125 of the decoder 5 are connected to the triggers 89, 90, 91 of the bidirectional pulse counter 24 through diode matrices 135-149 in a similar way and in accordance with the subsequent states of the triggers 89, 90, 91 of the bidirectional pulse counter 24.

The output buses 118-125 of the decoder 4 are connected to the clock pulse counter 3 through diode matrices 150-173 collected in the same order as the diode matrices 92-115 (FIG. 2) of the decoder 5.

The output bus 118 of the decoder 5 is connected to the triggers 86, 87, 88 of the clock pulse counter 3 through the diode matrices 50, 51, 52 in accordance with the first state of the triggers 86, 87, 88. The output bus 119 of the decoder 5 is connected to the triggers 86, 87, 88 of the clock pulse counter 3 through diode matrices 153, 154, 155 in accordance with the second state of the triggers 86, 87, 88. The output bus 120 is connected to the triggers 86, 87, 88 of the clock pulse counter 3 through diode matrices 156, 157, 158 in accordance with the third state of the triggers 86, 87, 88. The remaining output buses 121-125 are connected to the triggers 86, 87, 88 of the clock pulse counter 3 in a similar way.

The output buses 118-125 of the decoder 4 for time-shifted pulse trains are connected to an AND-gate 174 whose output serves as an output of the decoder 4.

Besides, the output buses 118-125 are connected directly to the power source 117.

The diode matrices of the other decoders 6, 7 for time-shifted pulse trains are constructed according the same principle as the matrices of the decoders 4, 5 to provide a time shift of the start of operation of the phases by (1/4) T with respect to the preceding pulse.

The device I for digital control of polyphase thyristor-pulse converter operates as follows.

The main thyristors 12, 13, 14, 15 are rendered conductive with a time shift equal to (1/4) T for supplying the voltage from the power source 117 to the motors 33, 34, 35, 36 and series field windings 37, 38, 39, 40. During this period (pulse period) the current in the motors 33, 34, 35, 36 rises up from minimum to maximum. After a required duration of the pulse for closing the circuit of the main thyristors 12, 13, 14, 15 the switching thyristors 16, 17, 18, 19 are rendered conductive with a time shift (1/4) T. When the switching thyristors 16, 17, 18, 19 are conducting, the reverse voltage of the switching capacitors 29, 30, 31, 32 is applied to the main thyristors 12, 13, 14, 15. During the pause the current through the motors 33, 34, 35, 36 are field windings 37, 38, 39, 40 is maintained through the reverse diodes 41, 42, 43, 44 due to the electromagnetic energy stored during the pulse in the inductances of the motors 33, 34, 35, 36 and field windings 37, 38, 39, 40.

The voltage on the motors 33, 34, 35, 36 is increased by increasing the pulse duration, i.e. by increasing the delay in rendering the switching thyristors conductive relative to the moment of rendering conductive the main thyristors 12, 13, 14, 15. After the period T is over, the cycle is repeated.

The pulses applied to the power thyristors of the thyristor-pulse converter are shaped as follows.

When one control pulse fed from the control unit 21 through the adding output 22 is applied to the adding input of the bidirectional pulse counter 24, the triggers of the latter are set to the first state as shown in Table 1. In accordance with the state of the triggers 89, 90, 91 of the bidirectional pulse counter 24 binary codes are fed to the decoders 4, 5, 6, 7 for time-shifted pulse trains.

The clock pulses from the master oscillator 2 are fed continously to the input of the clock pulse counter 3. The pulses applied to the clock pulse counter 3 change the states of the triggers 86, 87, 88. The binary codes from the logical outputs of the clock pulse counter 3 are fed to the decoder 20 for time-constant pulse trains and to the decoders 4, 5, 6, 7 for time-shifted pulse trains.

The first pulse sent from the master oscillator 2 to the clock pulse counter 3 produces a pulse at the output 25 of the decoder 20. When the $((2^n/m)+1)$-th pulse from the master oscillator 2 comes to the clock pulse counter 3, a pulse appears at the output 26. When the $$(2\frac{2^n}{m} + 1)\text{-th}$$

pulse comes to the clock pulse counter 3, a pulse appears at the output 27. When the $$(3\frac{2^n}{m} + 1)\text{-th}$$

pulse comes to the clock pulse counter 3, a pulse appears at the output 28.

Thus, the control pulses are fed to the main thyristors 12, 13, 14, 15 of the thyristor-pulse converter with a time shift (1/m) T, in this case with a time shift (1/4) T.

When the first state of the triggers 86, 87, 88 of the clock pulse counter 3 coincides with the first state of the triggers 89, 90, 91 of the bidirectional pulse counter 24, a control pulse is produced at the output of the decoder 4. This control pulse is shifted in time with respect to the pulse fed from the output 25 of the decoder 20 for time-constant pulse trains by a value equal to the discretity of quantization of the period of switching the thyristors of the thyristor-pulse converter.

When the first state of the triggers 89, 90, 91 of the bidirectional pulse counter 24 coincides with the $((2^n/m)+1)$-th state of the triggers 86, 87, 88 of the clock pulse counter 3, a control pulse appears at the output of the decoder 5. This pulse is shifted in time with respect to the pulse fed from the output 26 also by a value equal to the discretity of quantization of the period of switching the thyristors of the thyristor-pulse converter.

When the first state of the triggers 89, 90, 91 of the bidirectional pulse counter 24 coincides with the $$(2\frac{2^n}{m} + 1)\text{-th}$$

state of the triggers 86, 87, 88 of the clock pulse counter, a control pulse appears at the output of the decoder 6 for time-shifted pulse trains. This control pulse is shifted in time with respect to the pulse fed from the output 27 of the decoder 20 by a value equal to the discretity of quantization of the switching period of the thyristors of the thyristor-pulse converter.

Finally, when the first state of the triggers 89, 90, 91 of the bidirectional pulse counter 24 coincides with the $$(3\frac{2^n}{m} + 1)\text{-th}$$

state of the triggers 86, 87, 88 of the clock pulse counter 3, a pulse appears at the output of the decoder 7. This pulse is also shifted in time with respect to the pulse fed from the output 28 of the decoder 20 for time-constant pulse trains by a value equal to the discretity of quantization of the switching period of the thyristors of the thyristor-pulse converter.

Thus, the main thyristors 12, 13, 14, 15 of the phases 8, 9, 10, 11 of the thyristor-pulse converter are rendered conductive for a time period equal to the discretity of quantization of the switching period of the thyristors of the thyristor-pulse converter with a time shift (1/4) T.

When the second pulse from the control unit 21 is fed to the adding input 22 of the bidirectional counter 24, the triggers 89, 90, 91 of the bidirectional counter 24 are set to the second state according to Table 1.

When thus second state of the triggers 86, 87, 88 of the clock counter 3 coincides with the second state of the triggers 89, 90, 91 of the bidirectional counter 24, the output of the decoder 4 produces a pulse shifted in time with respect to the pulse fed from the output 25 of the decoder 20 for time-shifted pulse trains by a double value equal to the discretity of quantization of the switching period of the thyristors of the thyristor-pulse converter. The pulses fed from the output of the decoder 5 for time-shifted pulse trains are shifted by the same value with repect to the pulses fed from the output 26 of the decoder 20 of time-constant pulse trains fed from the output of the decoder 6 for time-shifted pulse trains, with respect to the pulses fed from the output 27 of the decoder 20 for time-constant pulse trains, and pulses fed from the output of the decoder 7 for time-shifted pulse trains with respect to the pulses fed from the output 28 of the decoder 20 for time-constant pulse trains.

As the pulses from the adding output 22 of the control unit 21 are fed to the bidirectional pulse counter 24, the time shift is increased. The maximum shift is equal to the switching period of the thyristors of the thyristor-pulse converter. If it is necessary to reduce the pulse duration, the control pulses are fed from the control unit 21 to the bidirectional counter 24 through the subtracting output 23. In this case the reduction of the pulse duration is provided in a reverse order.

Thus, the use of the device for digital control of a polyphase converter makes it possible to reduce the quantity of elements of the clock pulse counter unit 3 and control pulse counter unit 24 by making each of these units in the form of a single binary counter and this improves the reliability and quality of control and reduces the overall dimensions and cost.

What is claimed is:

1. A device for digital control of a polyphase thyristor-pulse convertor consisting of several phases, including power thyristors, comprising:

a master oscillator having an output;

a clock pulse counter having an input, first logical outputs and second logical outputs whose number is equal to the number of digits, the input of said counter being connected to the output of said master oscillator; said second outputs of the clock pulse counter determining the states of said clock pulse counter corresponding to the shift of the start of operation of each phase of said thyristor-pulse convertor by (1/m) T, where m is the number of phases of said thyristor-pulse convertor, T is the switching period of the thyristors of the thyristor-pulse converter;

a decoder for time-constant pulse trains having inputs and outputs whose number is equal to the number of phases of said thyristor-pulse convertor, said decoder having inputs connected to the second outputs of said clock pulse counter and having outputs connected to said power thyristors of the thyristor-pulse converter;

a control unit having a first adding output and a second subtracting output;

a bidirectional pulse counter having a first adding input, a second subtracting input and a plurality of logical outputs whose number is equal to the double number of digits connected through its first adding input and second subtracting input to the first adding output and second subtracting output of said control unit;

decoders for time-shifted pulse trains whose number is equal to the number of phases of said thyristor-pulse convertor; each of said decoders for time-shifted pulse trains having first inputs, second inputs and an output, connected through its first inputs to the first and second logical outputs of said clock pulse counter, connected through its second inputs to the logical outputs of said bidirectional pulse counter, and connected through its output to the other power thyristors of said thyristor-pulse converter; each of said decoders for time-shifted pulse trains includes dual diode matrices determining the shift of the time-shifted pulse trains (1/m) T, whose inputs form the first inputs of each of said decoders for time-shifted pulse trains and includes diode matrices determining the identical states of said bidirectional pulse counter whose inputs form the second inputs of each of said decoders for time-shifted pulse trains.

* * * * *